Dec. 27, 1949   E. W. BALLENTINE   2,492,207
INDUCTION MOTOR

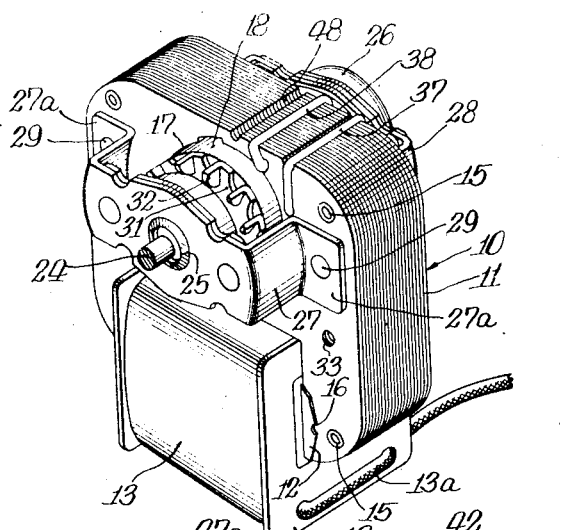

Filed Nov. 22, 1946                            2 Sheets-Sheet 2

INVENTOR.
Earle W. Ballentine.
BY
Foorman L. Mueller
Atty.

Patented Dec. 27, 1949

2,492,207

UNITED STATES PATENT OFFICE 2,492,207

INDUCTION MOTOR

Earle W. Ballentine, Chicago, Ill., assignor to Russell Electric Company, Chicago, Ill., a corporation of Illinois Application November 22, 1946, Serial No. 711,694

5 Claims. (Cl. 172—278)

1

The present invention relates to induction motors and more particularly to fractional horsepower motors of the shaded-pole type. Specifically, the present invention is an improvement on the invention disclosed and claimed in my prior copending application for Letters Patent of the United States, Serial No. 608,419, filed August 2, 1945, Patent No. 2,454,589, issued November 23, 1948, and assigned to the same assignee as the present application.

The shaded-pole motor is used very extensively in a great many applications at the present time. It is a well known fact that the shading coils used in connection with a shaded-pole motor for linking a portion of the flux in the pole cause a lag in the flux which passes through the shading coils relative to the flux not linked by the shading coils so that there is in a shaded-pole motor energized from a single phase source a tendency towards the rotating field so well known in connection with polyphase motors for example. The theory underlying the operation of shaded-pole motors is not too well understood. However, the shaded-pole motors of the prior art have been notoriously low in efficiency and in addition, the characteristic speed-torque curve included a decided dip in the neighborhood of 1600 R. P. M. for a two-pole motor. Also the starting torque has been low so that such prior art motors were unsatisfactory for many applications. In the motor disclosed and claimed in my prior copending application, it was found that by employing a relatively non-homogeneous arrangement of stator and rotor elements that the efficiency of such a shaded-pole motor was considerably increased and the starting torque, for example, was increased by as much as 35 percent. It would be desirable to provide a shaded-pole motor costing no more to manufacture than the shaded-pole motor described in my above-mentioned copending application which not only has a greatly increased efficiency and starting torque but in addition, is characterized by the absence of a dip in the speed-torque curve.

Accordingly, it is an object of the present invention to provide a new and improved shaded-pole motor having increased starting torque and efficiency.

It is another object of the present invention to provide a shaded-pole motor in which the speed-torque curve is characterized by the absence of any dip.

It is a further object of the present invention to provide a shaded-pole induction motor having greatly increased efficiency and torque relative to similar shaded-pole motors used heretofore while employing a construction that is no more expensive either from the standpoint of labor or materials than such motors used heretofore.

It is a feature of the present invention to provide a two-pole shaded-pole induction motor employing in addition to two shading windings per pole a reluctance gap extending over a portion of each pole face so that effectively a four-phase motor is provided, the phases being characterized by the instantaneous space positions of the airgap flux along each pole face with the most leading flux being that associated with the reluctance gap, followed by the main flux, the flux linked by only one shading coil, and the flux linked by two shading coils in that order.

It is a further object of the present invention to provide an effective four-phase, two-pole shaded-pole induction motor having greatly improved characteristics.

Further objects and advantages of the present invention will become apparent as the following description proceeds and the features of novelty which characterize this invention will be pointed out with particularity in the claims annexed to and forming a part of this specification.

For a better understanding of the present invention, reference may be had to the accompanying drawings in which:

Fig. 1 is a perspective view of a core type shaded-pole motor embodying the present invention;

Fig. 2 is an enlarged view of a portion of the stator and rotor of the motor of Fig. 1 to more clearly bring out the invention;

Fig. 3 is a sectional view taken on line 3—3 of Fig. 2 with the rotor removed;

Figure 4:
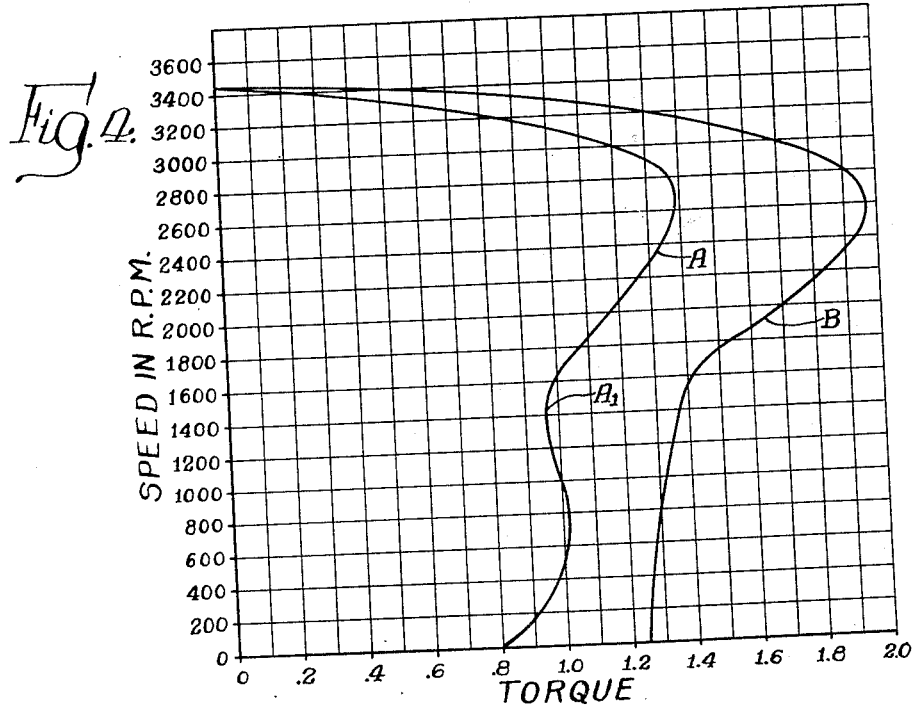
Fig. 4 illustrates for comparison purposes speed-torque curves for the motor of the present invention and the best of similar types of shaded-pole motors of the prior art.

In practicing the present invention, the elements of the motor except for the stator laminations may be identical with the elements of the motor disclosed and claimed in my prior copending application referred to above. Instead, however, of the airgap flux per pole having three different phase characteristics, a four-phase flux is produced by providing in addition to the main airgap flux and the two sets of fluxes embraced by only one and by more than one shading coil, a leading flux obtained by providing over a portion of the pole face an increased airgap generally referred to hereinafter as a reluctance gap. With this four-phase construction, greatly increased torques and efficiency are obtained and the speed-torque curve of the motor is characterized by the absence of the dip which heretofore has been associated with the speed-torque curves of shaded-pole motors.

Referring now to Figs. 1 to 3 of the drawings, there is illustrated a core type stator generally designated at 10 comprising a plurality of laminations 11 which are preferably stamped from sheets of a suitable magnetic material such as iron. From the transformer analogy, the so-called "core type" stator 10 is one where the energizing winding encloses the entire section of the magnetic circuit through the poles. Using the same analogy the type of stator employed in the modification of Fig. 5 of the drawings may be designated as a "shell-type" stator. As shown in Fig. 1 of the drawings, the stator 10 actually comprises two sets of laminations; namely, the laminations 11 and a set of laminations 12 which latter laminations form a removable insert to facilitate the mounting of a magnetic field producing winding 13 supported on a suitable insulating spool or the like 14 which embraces the core structure of the stator. For a particular design of motor embodying the present invention which has been successfully built and tested, these laminations 11 and 12 when fitted together form a rectangular core having outside dimensions of 2¼ by 2⅜ inches and being provided with a plurality of openings including one for the winding 13. The winding 13 mounted on the spool 14 may be placed on the insert formed of the laminations 12 whereupon the insert may be mounted in the position shown in Fig. 1 of the drawings to complete the stator 10. The winding 13 which may have the terminals thereof suitably supported as indicated at 13a by the ends of the spool 14 is adapted to be connected to a suitable source of single phase alternating current, preferably the conventional 60 cycle source. The laminations 11 are held in assembled relationship by suitable fastening means such as the rivets 15 for example while the laminations 12 are similarly held together. The insert formed of the laminations 12 may be provided with suitable interlocking means cooperating with interlocking means on the laminations 11 as shown at 16 in Fig. 1 of the drawings whereby the laminations 11 and 12 are held in rigid interlocked relationship with a suitable opening being defined thereby so that the winding 13 may enclose a section of the laminated core defining the stator 10.

As in the core type motor of my prior copending application referred to above, the stator laminations 11 are also provided with a circular opening 17 for receiving a cylindrical rotor 18. As illustrated best in Fig. 2 of the drawings, this circular opening 17 is positioned on the vertical center line 19 of the stator 10 with reference to the vertical sides thereof but closely adjacent to one side perpendicular to this center line 19. The longitudinally aligned portions of the stator 10 on opposite sides of the circular opening 17 constitute the two magnetic poles 20 and 21 of the two-pole induction motor of the present invention. As in my prior copending application, the tips of the poles 20 and 21 extend around the rotor as indicated at 20a and 21a to form what are generally referred to as integral magnetic bridges whereby some flux from each pole may be diverted to the other pole without passing through the airgap between the rotor 18 and the stator 10. The purpose of these integral magnetic bridges is to increase the inductance of the shading coils described hereinafter.

The rotor 18 may be identical in every respect with the rotor disclosed and claimed in my copending prior application and as illustrated in the drawings, is of the squirrel cage type comprising an iron core formed of laminations similar to the stator laminations assembled in a stack having an over-all thickness equal to the thickness of the stack of stator laminations. As illustrated, these laminations are in the form of disks having a plurality of identical openings equally spaced along a circle closely adjacent to the periphery of the disks. When the rotor laminations are properly stacked, similar openings in each disk are in alignment so as to accommodate a plurality of rotor bars 22. The laminations of the rotor are held in assembled relationship by the rotor or inductor bars 22 which are electrically interconnected at their opposite ends by a pair of end plates 23 preferably formed of good conducting material such as copper or aluminum. These end plates preferably are of the same shape as the disks forming the rotor laminations and the ends of the rotor bars are preferably soldered to the disks 23 both for improving the electrical interconnections and also for mechanically maintaining the rotor in assembled relationship.

In order rotatably to relate the rotor 18 to the stator 10, the former is preferably provided with a suitable shaft 24 which may be related to the rotor by a press fit or any other suitable means. This shaft 22 is supported by suitable bearings 25 and 26 disposed in axial alignment immediately adjacent opposite ends of the rotor 18. These bearings 25 and 26 are formed at the center of two bracket plates 27 and 28, respectively, which bracket plates are formed of non-magnetic material whose opposite ends are bent as indicated at 27a with reference to the bracket 27 so as to lie flat against the sides of the stator 10. These brackets are suitably fastened as by rivets or the like indicated at 29 to the stator which brackets extend through suitable openings such as 30 in the stator laminations 11. If desired, a suitable disk 31 of non-magnetic material having upset fan-like projections 32 may be provided at one or both ends of the rotor for cooling the motor upon operation thereof. In addition, these projections which define the fan blades may also be employed for balancing purposes during the process of dynamically balancing the rotor 18 which may be accomplished by clipping off portions of various ones of the blades 32, to obtain the desired balance. If desired the stator 10 may also be provided with suitable openings 33 for mounting purposes or the like.

As was mentioned above, the rotor 16 as illustrated is identical with the rotor in my prior copending application and comprises an even number of rotor or inductor bars 22, eighteen being illustrated. For the particular size stator mentioned above employed in connection with a motor which has been built and successfully tested, a rotor having a diameter so as to freely rotate in an opening 17 having a diameter of 1.153 inches with eighteen equally spaced holes for the rotor bars 22 which holes are .116 inch in diameter and the centers of which holes are .498 inch from the center of the rotor has been found to be very satisfactory. An airgap of 15 mils has been found desirable for the specific design of rotor mentioned above. It should be understood, however, that the suggested use of an even number of rotor bars is by way of example only since particularly for high torque applications an odd number of rotor bars may be very satisfactorily employed.

As was described and claimed in my prior copending application referred to above, the stator 10 is provided with a plurality of shading coils or shading rings for each pole, two being shown for each pole in Fig. 2 of the drawings. The shading coils or windings for the pole 20 are designated by the reference numerals 35 and 36, while the shading coils for the pole 21 are designated by the reference numerals 37 and 38. The shading coils 35 and 37 effectively link the flux passing through a substantially greater area of the pole face than the shading coils 36 and 38 as is clearly apparent from the drawings. The shading coils 36 and 38 embrace only a portion of the pole structure which is already embraced by the shading coils 35 and 37 respectively. These shading coils are positioned in suitable slots or tunnels formed in the stator laminations closely adjacent the airgap between the rotor 18 and the stator 10. As illustrated, the portion of the shading coil 35 adjacent the rotor 18 is positioned in the slot or tunnel 39. The portion of the shading coil 36 adjacent the rotor 18 is positioned in the slot or tunnel 40. Similarly, the portion of the shading coil 37 adjacent the rotor 18 is positioned in the slot or tunnel 41 and the portion of the shading coil 38 adjacent the rotor 18 is positioned in the slot or tunnel 42. Suitable notches, all designated by the reference numeral 43 are provided in the stator laminations 11 to accommodate one other side of the shading coils or rings 35, 36, 37 and 38 which preferably are formed of one turn of a very low resistance conductor. It will be understood by those skilled in the art that a shading coil has its maximum effect in retarding the flux when it has a minimum resistance and a maximum inductance. As illustrated, the shading coils 35, 36, 37 and 38 comprise a heavy copper wire or the like. The tunnels or slots 39, 40, 41 and 42 are in accordance with my prior copending application referred to above, positioned in a non-symmetrical manner relative to the symmetrically disposed rotor bars 22 whereby as the rotor 18 rotates relative to the stator 10, the particular rotor bars adjacent the tunnels or slots 39 to 42, inclusive, come into alignment successively. In other words, at any instant if a particular rotor bar 22 is in alignment with a particular slot or tunnel such as 39 for example, then the rotor bars 22 adjacent the other slots or tunnels 40, 41 and 42 are not in alignment at that instant and in fact, are out of alignment by different varying amounts, thereby producing a much more satisfactory operation than in prior art arrangements. It will be noted that the shading rings or windings 35 and 36 which are each effectively a one-turn coil are angularly displaced with respect to each other as is also the case in connection with the shading rings 37 and 38. This is more fully described in my prior copending application referred to above and forms no part of the present invention. It should furthermore be understood that these shading coils could be disposed in generally parallel planes if desired and although only two shading coils per pole are illustrated a plurality per pole such as three or more per pole might be employed. Three shading coils per pole would for the arrangement of Fig. 1 provide an effective five-phase motor.

For the purpose of bringing out generally the distribution of the flux in the airgap between the rotor 18 and the stator 10 each pole such as the pole 20 may be considered as comprising the sections or teeth 44, 45, 46 and 47, respectively. The tooth 44 may be considered to be that portion of the pole 20 between the tunnel 40 and the center line 19, while the tooth 45 may be considered to be the portion of the pole 20 between the tunnels 39 and 40. In my prior copending application the remainder of the pole 20 might have been considered to be the tooth 46. In accordance with the present invention, however, the tooth 46 only extends between the slot or tunnel 39 and the point 46a and the portion of the pole 20 between the point 46a and the point 47a is designated as the tooth 47. There is designated on pole 20 in Fig. 2 of the drawings adjacent the teeth 44 to 47, inclusive, the symbols $\phi s_2$, $\phi s_1$, $\phi m$ and $\phi r$, respectively designating the magnetic fluxes varying in phase relative to one another and disposed in the airgap between the pole 20 and the rotor 18. The symbol $\phi s_2$ refers to the flux passing through the tooth 44 of the pole 20 linked by both of the shading coils or windings 35 and 36. The symbol $\phi s_1$ designates the flux passing through the stator tooth 45 linked by only the shading coil or winding 35 of the pole 21. The symbol $\phi m$ designates the flux passing through the main pole tooth 46. As will be brought out hereinafter, the symbol $\phi r$ designates the flux passing through the stator tooth 47. It will be understood by those skilled in the art, the flux $\phi s_1$ is lagging in phase relative to the flux $\phi m$ by a predetermined amount and the flux $\phi s_2$ lags by a still greater amount. Considering for the moment only the fluxes $\phi m$, $\phi s_1$, and $\phi s_2$, it is apparent that with this arrangement there is produced in effect a three-phase rotating field with the flux $\phi m$ in the airgap between the tooth 46 and rotor 18 leading the flux $\phi s_1$ in the airgap between the tooth 45 and rotor 18 which latter flux in turn leads the flux $\phi s_2$ in the airgap between the tooth 44 and rotor 18. It will be understood that the same analysis applies to the pole 21 except that the fluxes differ in phase with respect to the fluxes in the pole 20 by 180 degrees.

The integral magnetic bridges 20a and 21a referred to above are, as in my prior copending application, each provided with a suitable restriction such as an aperture or as illustrated the notches 48 which may be designed of such a size as to control the concentration of flux through the integral magnetic bridges 20a and 21a respectively. By properly adjusting or calibrating the concentration of flux which may be accomplished by varying the size of the grooves or notches 48, these integral magnetic bridges 20a and 21a may be worked at high flux values thereby throwing the desired volume of flux through the airgap between the stator and rotor for the purpose of increasing the inductance of the shading coils as was mentioned above as desirable to cause the shading coils to have their maximum effect. However, as can be noted in Fig. 2, the width of the notches 48 is small compared to either the adjacent stator teeth 47 or 44 so that the pole-face, pole-arc ratio is not substantially reduced by the notch. From Fig. 2 it is to be noted that the notches 48 separate the adjacent stator teeth 44 and 47 of adjacent pole-faces. It is apparent that the flux passing through each of the integral magnetic bridges 20a and 21a detracts from the airgap flux which latter is the only torque producing flux. Consequently, the effective size of the magnetic bridges controlled by the size of the notches 48 is rather critical. It is desirable to maximize the product of the airgap flux and the sine of the angle of phase lag between unshaded and shaded flux. It is, of course, well understood that both the magnitude and the phase of the flux in an induction motor determine the torque produced. The airgap flux is increased by increasing the size of the notches 48 while the sine of the angle is increased by decreasing the notches 48. It should be noted further that these notches 48 are off-center and in fact, as indicated in Fig. 2 of the drawings, are both positioned to the left of the center line 19 thereby providing an additional non-symmetrical relationship as is fully described and claimed in my copending application referred to above.

In accordance with the present invention, a four-phase, two-pole core type motor is provided by providing in each pole 20 and 21 a reluctance gap 49 defined with reference to the pole 20 for example between the tooth 47 and the rotor 18. Preferably, these reluctance gaps 49 comprise a cutaway portion of the stator laminations so as to define over a small area between the points 46a and 47a of the pole 20, and similarly with reference to the pole 21, a substantially increased airgap between rotor 18 and the stator 10. The cutaway portion defining the reluctance gap 49 has a circumferential area of the order of one-half the circumferential area of the main pole tooth 46 and the two cutaway portions defining the reluctance gaps 49 in each pole are somewhat non-symmetrically disposed relative to the center of the rotor 18 with the edges thereof being opposite and interconnectable by parallel lines such as 50 and 51, the line 50 interconnecting the point 46a of pole 20 with the point 52 of the pole 21 while the line 51 interconnects the point 47a of the pole 20 with the point 53 of the pole 21. The flux in the reluctance gaps 49 defined between the rotor 18 and the teeth 47 as was mentioned above is designated by the symbol $\phi_r$ in Fig. 2 of the drawings and leads the main flux $\phi_m$ by a predetermined amount so that effectively there is provided a four-phase motor with the fluxes in each pole being divided into four groups displaced in phase from each other with the flux $\phi_r$ leading the main flux $\phi_m$, and the fluxes $\phi_{s1}$ and $\phi_{s2}$ lagging the main flux by different varying amounts. The reluctance gaps for the specific motor referred to above are about 30 mils greater than the airgap between the rotor and the other portions of the poles 20 and 21.

The reason why the flux $\phi_r$ in the reluctance gap 49 leads the main flux $\phi_m$ in the shaded-pole induction motor of the present invention is perhaps most readily apparent from the following discussion. It has been stated that from one point of view an induction motor may be regarded as directly evolved from a direct current shunt motor; from another point of view, that it is closely akin to the static transformer; from still another that it resembles a generator feeding a fictitious resistance; and that all of these points of view are useful in understanding the physical behavior of such an induction motor. Since the phenomena involved in the shaded-pole motor of the present invention is equally applicable to both locked rotor and running conditions thereof, one can consider the locked rotor condition as being similar to a static transformer. It is apparent that the circuit defined by any particular pair of rotor bars 22 and the connecting end plates act like a shading ring or shading coil to the magnetic flux linked with this circuit. Furthermore, the induced current in this circuit due the pulsating magnetic field produced by the field structure will lag behind the electromotive force induced in the rotor bar electric circuit under consideration by an amount depending upon the resistance of this rotor bar circuit and its inductance. Although the inductance of this rotor bar circuit is a property of the conductor configuration in a space containing bodies of various permeabilities, one can consider the inductance of this rotor bar circuit as the flux per ampere. In other words, if a current circulates through the rotor bar circuit comprising two adjacent rotor bars 22 electrically interconnected by portions of the end plates 23, the flux produced by that current which flux passes through the airgap between the rotor and stator is equal to the magnetomotive force producing this flux divided by the reluctance of the path taken by this flux. It is obvious that the reluctance of this path is for all practical purposes the reluctance of the airgap, since the remainder of the magnetic circuit is iron with negligible reluctance relative to the reluctance of the airgap. Since the flux is inversely proportional to the reluctance, the greater the airgap the greater the reluctance and the lower the flux and consequently the lower the inductance of the circuit comprising two adjacent rotor bars and the end connections 23. When a particular pair of adjacent rotor bars are opposite the tooth 46 the inductance of the circuit including these two rotor bars is greater than is the inductance of this circuit when these rotor bars are opposite the tooth 47 adjacent the reluctance gap 49. As a result, the secondary current induced in the rotor bar circuit will lag more when the smaller airgap is effective than when the larger airgap is effective and the airgap flux due to the combined action of the primary magnetomotive force, which is the magnetomotive force produced by the winding 13, and the secondary magnetomotive force which is a result of the secondary current will lag more behind the primary current for the small airgap than the flux due to such combined action entering the rotor bar circuit where the airgap is large. Consequently, the flux where the airgap is large, since it lags the primary current by a lesser angle, would obviously lead the flux where the airgap is small which lags the primary current by a greater angle. In other words, the flux $\phi_r$ would lead the flux $\phi_m$.

It is obvious that if the notches or restrictions 48 were not present in the magnetic bridges 20a and 21a, the amount of flux entering the rotor through the reluctance gaps would be greatly reduced. That is, the concentration of flux through these bridges is controlled by the reluctance of the magnetic restrictions. Not only is the reluctance increased because of the reduction in cross-sectional area, but also because the permeability is reduced due to the saturation of the iron. The flux density through the reluctance gaps would be greatly decreased and the gaps would therefore be less effective if these notches were not present.

As will be brought out hereinafter, the provision of the so-called reluctance gaps 49 in the stator laminations has provided a marked improvement in torque and efficiency and caused the elimination of the characteristic dip in the shaded-pole motor speed-torque curve. This can readily be seen by a comparison of the two speed-torque curves A and B of Fig. 4 of the drawings. The curve A represents the speed-torque curve of the motor disclosed and claimed in my prior copending application which incidently shows a substantial improvement over any other prior art shaded-pole motors. The curve B represents the speed-torque curve of the motor disclosed in Figs. 1 to 3 of the drawings which differs from the motor of my prior copending application substantially only in the provision of the reluctance gaps 49. It will be observed from Fig. 4 of the drawings that the starting torque has been increased by about 50 percent. It will be noted that the pull-out torque which is in the neighborhood of 2500 R. P. M. has been increased over 30 percent and in addition, the characteristic dip indicated at $A_1$ in the curve A has disappeared and no dip in the speed torque curve B is present. In addition the efficiency of the motor has furthermore been increased by one-third or more.

The reason why the marked increase in efficiency and torque is obtained as well as the elimination of the characteristic dip of the speed-torque curve is not fully understood. Any logical argument or theory that could be advanced as to why the marked improvements in performance referred to above are obtained falls down when it is considered that extensive tests have shown that the employment of a reluctance gap as described above either made no improvement or actually caused inferior performance of a two-pole core type shaded-pole motor employing only a single shading coil per pole. Furthermore, tests in connection with a four-pole motor such as is disclosed and claimed in my prior Letters Patent of the United States No. 2,071,224 which employs the integral magnetic bridge as well as one shading coil per pole, clearly showed that no improved performance was obtained with the incorporation of a reluctance gap. Tests were also made on a motor such as is disclosed in Patent No. 2,071,224 referred to above except that two shading coils per pole instead of one were employed but no improved performance was found. In other words, the incorporation of the reluctance gap of the present invention in a shaded-pole motor which in the case of the integral magnetic bridge core type two-pole motor described above having a plurality of shading coils per pole provided such a marked improvement as described above had either no appreciable effect or actually caused an inferior performance when incorporated in either a two-pole motor having a single shading coil per pole or when incorporated in a four-pole motor having either one or a plurality of shading coils per pole. The marked improvement of the present invention might be explained on the basis that eccentricities of the leading magnetic field produced by the reluctance gap of the present invention combine with the eccentricities of the lagging magnetic fields produced by virtue of employing a plurality of shading coils on each pole in a manner to compensate for these eccentricities to provide the very desirable characteristics obtained, namely, the absence of a dip in the speed-torque curve and the greatly increased torque and efficiency. It should be understood that applicant does not intend to be bound by the theory or explanation advanced above for the greatly increased performance of the shaded-pole motor of the present invention in the event that it should later prove to be the incorrect theory in support of the improved performance.

In view of the detailed description included above, the operation of the effective four-phase, shaded-pole motor of the present invention which is energized from a single phase source will be understood by those skilled in the art. The reluctance gap section, the main pole section and the sections of the pole embraced by one and more than one shading coil produce a field which tends to approach the well known rotating field to produce greatly increased starting and operating torques and increased efficiency as discussed above and as is apparent from an examination of the curves of Fig. 4 of the drawings. As was mentioned above an odd number of rotor bars might be employed together with a symmetrical relation between the shading coils and rotor bars in which case it would be desirable for the pole face width of the tooth 47 which is also the width of the reluctance gap 49 to be equal to one and one-half times the rotor bar pitch in order to minimize the tendency of the rotor to lock at two points as would otherwise be the case when employing an odd number of rotor bars.

Figure 5:
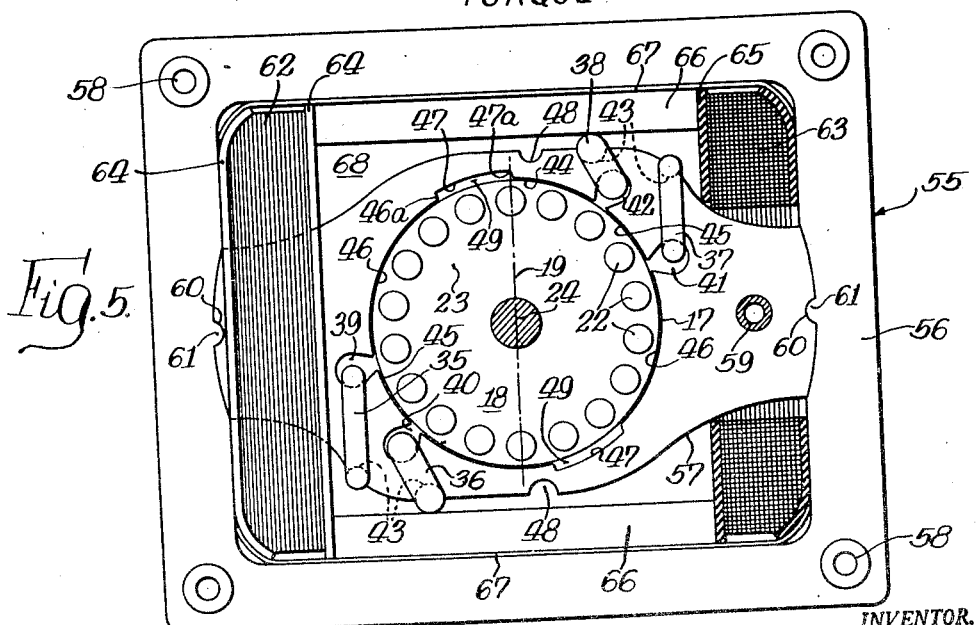
Fig. 5 is a view similar to Fig. 2 illustrating a modification of the present invention.

Referring now to Fig. 5 of the drawings, there is illustrated an alternative construction embodying the present invention in which the rotor and magnetic circuit immediately surrounding the airgap including the shading coils is identical with that of Figs. 1 to 3 of the drawings. Accordingly, the corresponding parts of Fig. 5 have been designated by the same reference numerals. The motor of Fig. 5 differs from the motor described above primarily in that it comprises, based on the transformer analogy, a shell-type motor as distinguished from a core type motor.

As illustrated, the shaded-pole motor of Fig. 5 also comprises a two-part stator generally designated at 55 comprising two separate sets of laminations 56 and 57. The laminations 56 preferably stamped from sheet material in the same manner as the laminations 11 of Fig. 1 have a generally rectangular external configuration with the central part cut away so as to define a substantially rectangular opening 68. The laminations 56 are held in stacked relationship by suitable rivets 58 and effectively define a rectangular annulus or shell enclosing the other portions of the motor whereby the characteristic designation of "shell-type motor" arises. The laminations 57 form a removable insert similar to the insert 12 in the motor of Fig. 1 of the drawings and these laminations 57 are also stacked and held in stacked relationship by suitable rivets 59. The laminations 57 are provided with a circular opening 17, identical with the opening 17 in the stator 10 of the motor of Fig. 1, for receiving the cylindrical rotor 18. The portions of the laminations 57 surrounding the circular opening 17 are formed in identically the same manner as the laminations 11 of Figs. 1 and 2 of the drawings surrounding the opening 17 and no further description thereof will be included except that all of the portions thereof are designated by the same reference numerals as in Figs. 1, 2, and 3, of the drawings. The laminations 57 which form the removable insert are each provided at either end thereof with a notch or groove 60 which cooperates with protuberances 61 formed on each lamination 56. With this arrangement, suitable interlocking means are provided whereby the laminations 57 in stacked form are held in rigid interlocked relationship with the laminations 56 in stacked form in the same manner that the interlocking means 16 of Fig. 1 of the drawings holds the insert 12 in position relative to the remainder of the stator 10.

Instead of employing a single field winding as was the case in connection with the core type motor described above, the shell-type stator of Fig. 5 of the drawings employs two identical windings 62 and 63 mounted on suitable spools 64 and 65, respectively, which are positioned on the ends of the insert defined by the laminations 57. One of the windings is shown in section better to illustrate the invention. If desired, suitable insulating spacers such as 66 may be provided to hold the spools 64 and 65 supporting the windings 62 and 63, respectively, in fixed position. These insulating spacers may be formed of wood or any other suitable material. Preferably strips of insulating material 67 are interposed between the shell-type stator laminations 56 and the field windings mounted on spools 64 and 65, respectively.

In view of the fact that the shell-type shaded-pole motor of Fig. 5 of the drawings is identical in so far as the airgap and shading coil arrangement is concerned with that of the motor of Figs. 1 to 3 described above, no further discussion is deemed necessary. The shell-type motor provides a symmetrical relationship between the rotor shaft 24 and the frame of the motor which may be advantageous in certain applications.

It should be understood that the present invention is not limited to the specific details and arrangements herein illustrated and it is intended in the appended claims to cover all changes and modifications that fall within the true spirit and scope of the present invention.

What is desired to be secured by Letters Patent of the United States is:

1. In a shaded-pole motor of the core type the combination of a laminated stator core having a plurality of poles, a rotor of a squirrel cage type having equally spaced conducting rotor bars adjacent to the cylindrical surface exposed to the faces of said poles, a plurality of shading rings associated with each pole, one of said shading rings linking a first section of its associated pole, another of said shading rings associated with said pole linking a second section comprising all of said first section plus an additional section of said pole, the remainder of said pole comprising third and fourth sections, the airgaps between said rotor said first, second and third sections being substantially the same, and the airgap between said fourth section and said rotor being substantially greater than said first-mentioned airgaps, each of said sections having an extent sufficient to include at least two of said rotor bars, said four sections being so related relative to said rotor that a point on said rotor during rotation thereof moves past first said fourth section and then said third, second and first sections in that order, said core including high reluctance portions joining said first section of each pole with said fourth section of the adjacent pole, said reluctance portions having an extent small compared with the spacing of said rotor bars, and a winding positioned on said core and adapted to be energized from a single phase alternating current source.

2. An alternating current shaded-pole motor comprising a stack of stator laminations defining a core having a circular opening therein, an energizing winding adapted to produce an alternating current flux in said core with the two portions of said core on each side of a predetermined diameter of said opening defining a pair of field poles having opposed concave pole faces, a cylindrical squirrel cage rotor disposed in said opening and rotatable relative to said poles, said rotor having an even number of symmetrically positioned rotor bars, a pair of slots in each of said pole faces, a pair of shading rings for each pole one disposed in each of said slots dividing said concave faces of each pole into a first section from which unshaded flux enters said rotor and a shaded section from which a lagging flux enters the rotor, said first section including a portion defining a high reluctance gap relative to the airgap between the rotor and the remainder of said first section so that a flux leading the flux in said remainder of said first section enters the rotor through said high reluctance gap, said high reluctance gap having an extent sufficient to include at least two rotor bars, high reluctance bridges joining said field poles, said bridges being very short so that said pole faces cover substantially the entire cylindrical surface of said rotor, said slots in said pole faces being spaced differently from the rotor bars so that the rotor and stator elements are asymmetrically related.

3. In an alternating current shaded-pole motor, a stack of stator laminations defining a core having a substantially circular opening therein, an energizing winding adapted to produce an alternating current flux in said core with the two portions of said core on each side of a predetermined diameter of said opening defining a pair of field poles having opposed concave surfaces with the tips thereof interconnected by integral high reluctance magnetic bridges, a cylindrical squirrel cage rotor including spaced rotor bars positioned in said opening and rotatable relative to said poles, said bridges having an extent which is small compared to the spacing of said rotor bars, and a plurality of shading rings for each pole dividing said concave surface of each pole into a first section from which unshaded flux enters said rotor and a shaded section from which a lagging flux enters said rotor, said first section including a portion having an increased airgap relative to said rotor so that a flux leading the flux in the remainder of said first section enters the rotor through said increased airgap, said portion extending about said opening for a distance sufficient to include at least two rotor bars said flux in said shaded section being divided into a plurality of parts lagging the flux in said remainder of said first section by varying amounts, whereby each pole produces an effective multiphase airgap flux and the efficiency and starting torque of said motor are greatly increased.

4. In an alternating current shaded-pole motor of the integral bridge shell type, a stack of stator laminations defining a core including a removable laminated insert, means defining a substantially circular opening in said insert, a pair of energizing windings disposed on said insert one on either side of said opening adapted to produce an alternating current flux in said core with the two portions of said insert on either side of said opening defining a pair of field poles having opposed concave surfaces, a cylindrical rotor positioned in said opening and rotatable relative to said poles, a plurality of shading rings for each pole dividing said concave surface of each pole into a first section from which unshaded flux enters said rotor, and a shaded section from which a lagging flux enters the rotor, said first section including a portion having an increased airgap relative to said rotor so that a flux leading the flux in the remainder of said first section enters the rotor through said increased airgap, said flux in said shaded section being divided into a plurality of parts lagging the flux in the remainder of said first section by varying amounts whereby an effective multi-phase flux is produced in each pole, said insert including integral high reluctance portions adjoining said poles, said high reluctance portions being very narrow so that said pole surfaces cover substantially the entire cylindrical surface of said rotor.

5. In an induction motor of the shaded-pole type, the combination comprising a laminated stator having a plurality of poles, a rotor of the squirrel cage type having equally spaced conducting rotor bars therein, at least two shading rings associated with each pole for providing first and second pole sections in which the flux lags the flux in the remainder of said pole, one of said shading rings linking said second pole section and all of said shading rings linking said first pole section so that the flux in said first pole section lags a greater amount than said flux in said second pole section, the remainder of each pole being divided into third and fourth sections, the air gaps between said first, second and third sections and said rotor being substantially the same, the air gap between said fourth section and said rotor being greater than said first mentioned air-gaps so that the flux in said fourth section leads the flux in said third section, said fourth sections extending along said rotor for a distance equal to at least one and one-half times the spacing of said rotor bars, said sections being so positioned relative to said rotor that during rotation thereof said rotor bars move past said fourth section and then said third, second, and first sections in that order, said stator including integral high reluctance bridges joining said first section of each pole and said fourth section of the adjacent pole, said high reluctance bridges having an extent less than the extent of said fourth sections of said poles.

EARLE W. BALLENTINE.

REFERENCES CITED

The following references are of record in the file of this patent:

UNITED STATES PATENTS

| Number | Name | Date |
|---|---|---|
| 1,952,220 | Price | Mar. 27, 1934 |
| 1,992,956 | Lilja | Mar. 5, 1935 |
| 2,071,224 | Ballentine | Feb. 16, 1937 |
| 2,122,374 | Kohlhagen | June 28, 1938 |
| 2,261,890 | Schneider | Nov. 4, 1941 |
| 2,344,401 | Finch | Mar. 14, 1944 |